United States Patent
Magni et al.

(10) Patent No.: US 8,806,739 B2
(45) Date of Patent: Aug. 19, 2014

(54) SYSTEM FOR FRAMING MOTOR-VEHICLE BODIES OR SUB-ASSEMBLIES THEREOF

(75) Inventors: Gianni Magni, Grugliasco (IT); Mauro Maestri, Grugliasco (IT)

(73) Assignee: Comau S.p.A., Grugliasco Turin (IT)

( * ) Notice: Subject to any disclaimer, the term of this patent is extended or adjusted under 35 U.S.C. 154(b) by 247 days.

(21) Appl. No.: 13/384,306

(22) PCT Filed: Jun. 22, 2010

(86) PCT No.: PCT/IB2010/052813
§ 371 (c)(1),
(2), (4) Date: Feb. 29, 2012

(87) PCT Pub. No.: WO2011/013012
PCT Pub. Date: Feb. 3, 2011

(65) Prior Publication Data
US 2012/0145514 A1 Jun. 14, 2012

(30) Foreign Application Priority Data
Jul. 27, 2009 (EP) .................................. 09425299

(51) Int. Cl.
*B23P 19/04* (2006.01)
*B23P 19/10* (2006.01)

(52) U.S. Cl.
USPC ................ 29/824; 29/822; 29/823; 29/897.2; 29/430

(58) Field of Classification Search
USPC ........ 29/430, 711, 791, 795, 822–824, 281.4, 29/281.1, 281.5; 228/6.1; 219/86.24
See application file for complete search history.

(56) References Cited

U.S. PATENT DOCUMENTS

| | | | | |
|---|---|---|---|---|
| 5,400,943 | A | * | 3/1995 | Rossi .............................. 228/6.1 |
| 7,296,726 | B2 | * | 11/2007 | Caputo et al. ................ 228/49.1 |
| 7,469,473 | B2 | * | 12/2008 | Savoy ........................... 29/897.2 |
| 2008/0105733 | A1 | * | 5/2008 | Monti et al. ................... 228/178 |

FOREIGN PATENT DOCUMENTS

| | | |
|---|---|---|
| DE | 10 2007 024589 A1 | 11/2008 |
| EP | 0 642 878 A2 | 3/1995 |
| EP | 0 835 717 A1 | 4/1998 |
| EP | 0 976 491 A1 | 2/2000 |
| EP | 1 611 991 A1 | 6/2004 |
| EP | 1 686 048 A2 | 8/2006 |
| EP | 1 837 120 A1 | 9/2007 |
| EP | 1 897 653 A1 | 3/2008 |
| EP | 1 918 182 A1 | 5/2008 |
| EP | 1 935 554 A1 | 6/2008 |
| GB | 2 151 991 A | 7/1985 |

* cited by examiner

*Primary Examiner* — Alexander P Taousakis
*Assistant Examiner* — Matthew P Travers
(74) *Attorney, Agent, or Firm* — Young Basile Hanlon & MacFarlane P.C.

(57) ABSTRACT

In a framing system for framing motor-vehicle bodies or sub-assemblies thereof, the body to be framed is located and clamped in position during the assembling operations by side locating and clamping structures (8). Each of these structures comprises a rigid supporting structure (82) including a base platform (82a) and a frame (81) which carries locating and clamping devices (D). The base platform (82a) is dimensioned in the direction parallel to a body conveyor line with a standard length proportionated to the length of the longest body type on which the system is to operate. Pillars (82b) for supporting the frame (81) are mounted on the platform (82a) at positions which are selected between different possible positions, displaced relative to each other longitudinally and/or transversely. Thus, the side locating and clamping structures (8) can be configured easily for different types of body and the system is able to operate on body types having also very relevant differences in length and/or width.

7 Claims, 18 Drawing Sheets

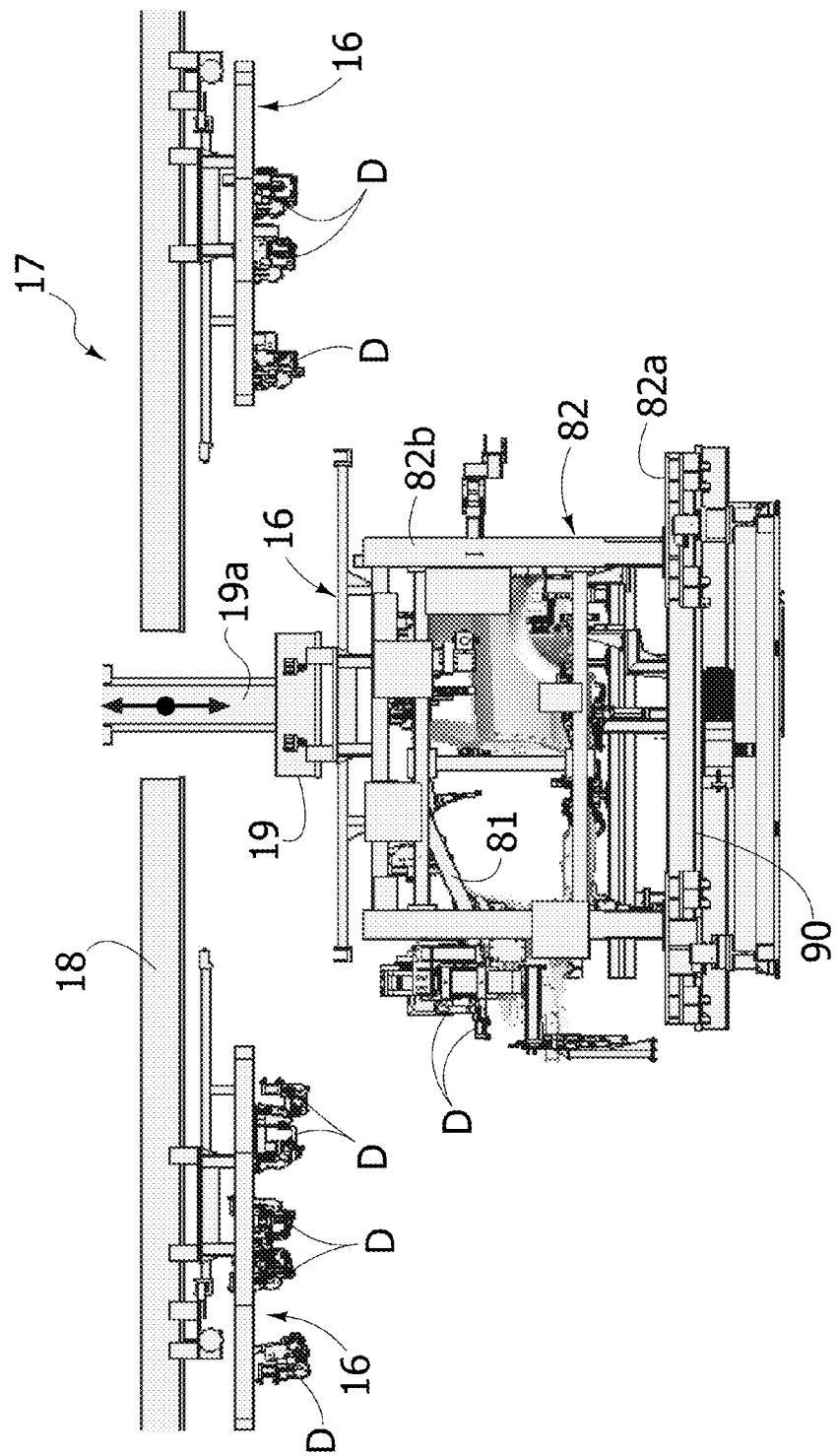

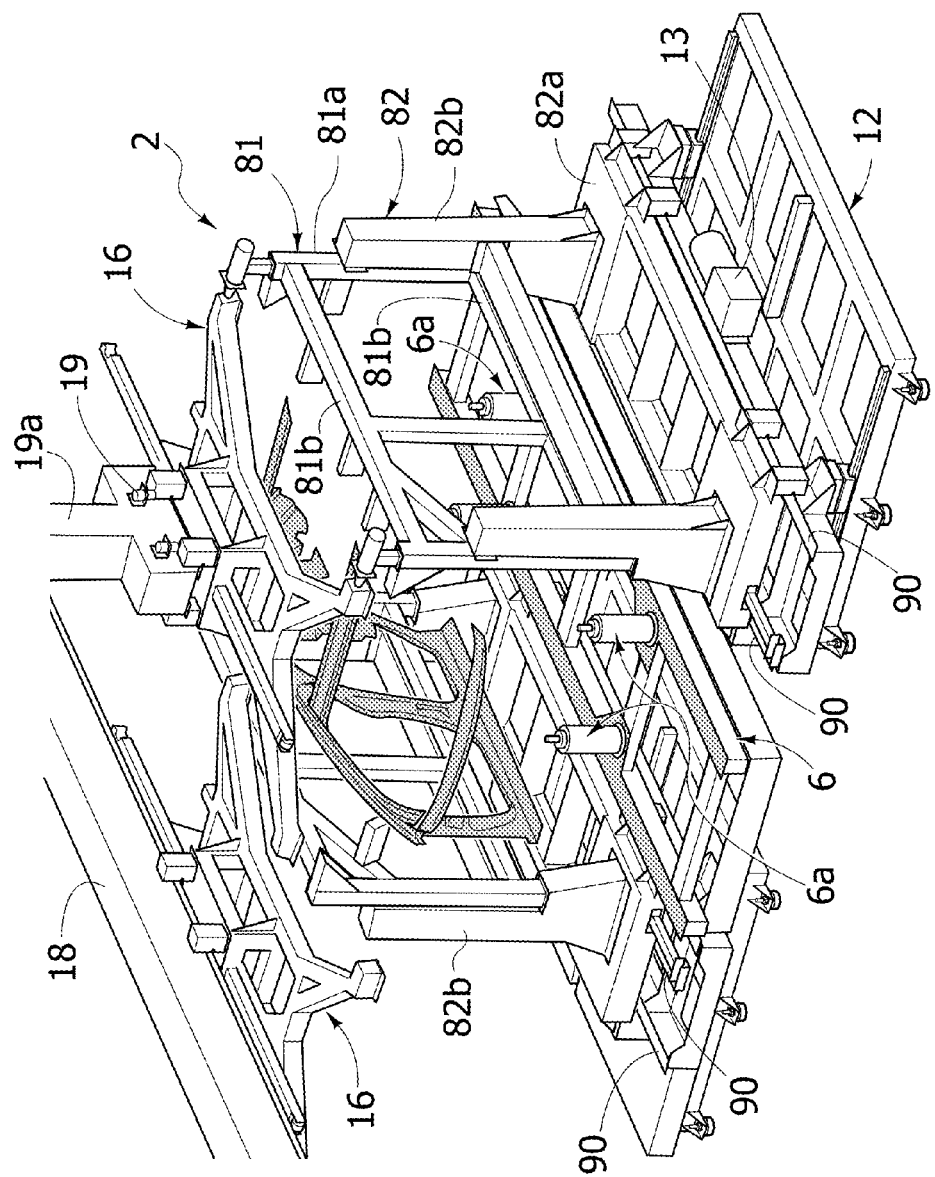

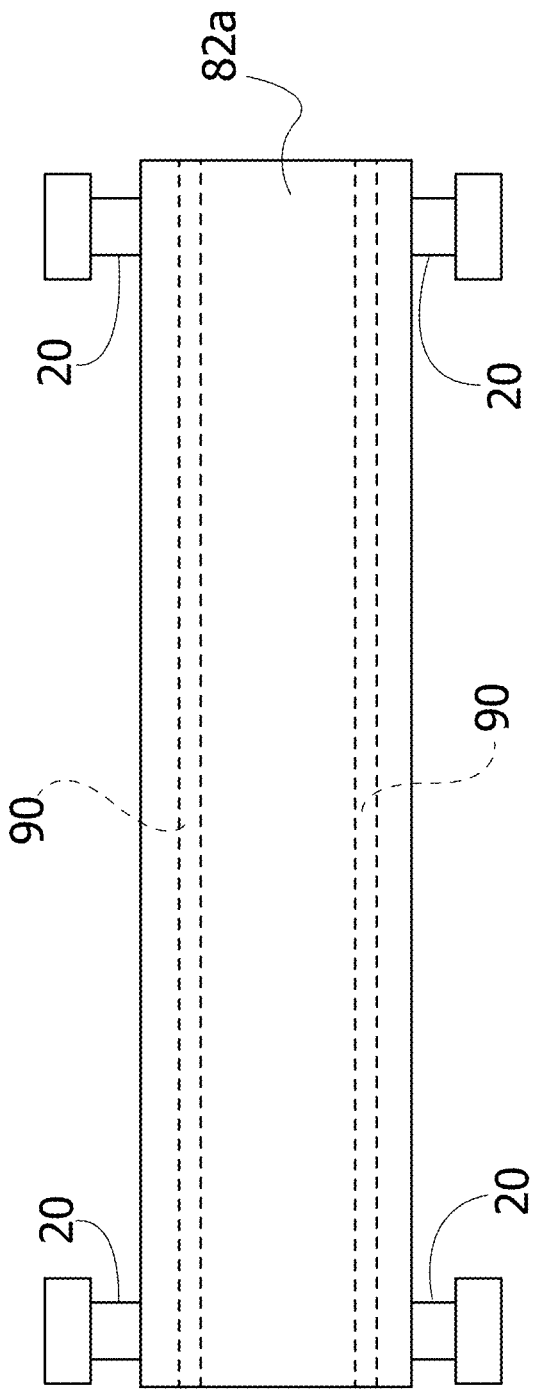

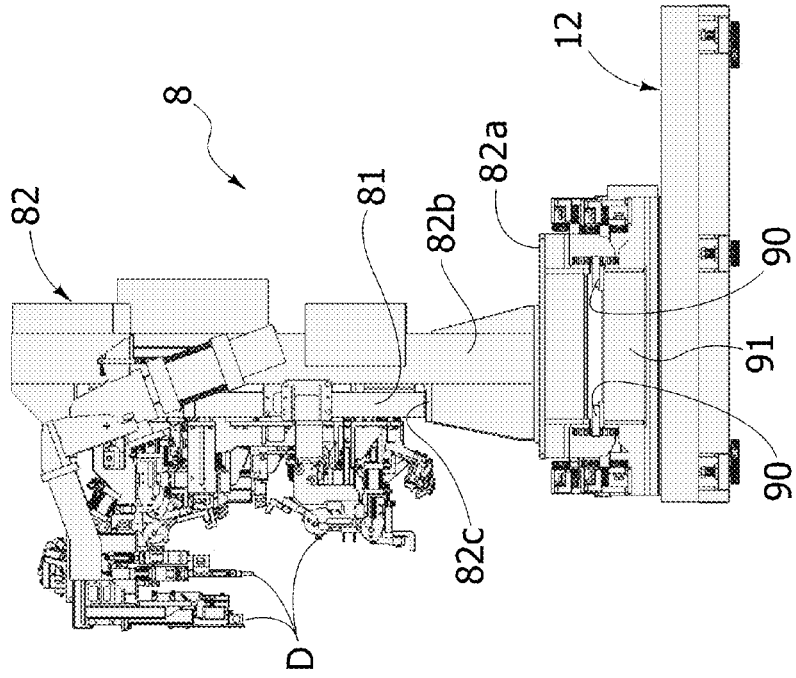
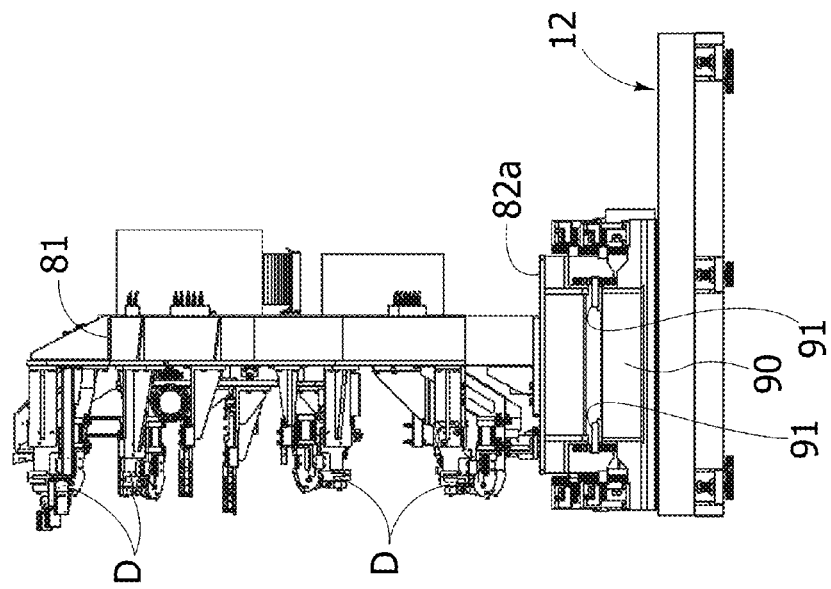

SYSTEM FOR FRAMING MOTOR-VEHICLE BODIES OR SUB-ASSEMBLIES THEREOF

CROSS-REFERENCE TO RELATED APPLICATIONS

This application claims priority from European Patent Application Serial No. 09425299.6, filed Jul. 27, 2009 which is incorporated herein in its entirety by reference.

FIELD OF THE INVENTION

The present invention relates to a system for framing motor-vehicle bodies or sub-assemblies thereof.

BACKGROUND

In the present description and in the following claims, the term "framing" is used to mean the operation by which a relatively stable geometry is conferred to a motor-vehicle body formed by elements of pressed sheet-metal or to a sub-assembly thereof. Typically this operation is carried out by applying a plurality of welds or clinched joints or riveted joints to a body comprising a lower sub-assembly or floor panel, two side portions connected to the floor panel at the two sides thereof and two or more cross-members which connect the side portions at their top. The welds/clinched joints/riveted joints can be carried out for instance manually or preferably by means of programmable robots provided at a framing station, where the component parts of the body are precisely located in position and clamped until the framing operation is completed. It is well understood that the present invention is applicable both to plants in which the framing operation is carried out at a single station, and to plants in which the framing operation is carried out at many stations arranged after each other, in which case the principles of the invention may be used also at framing stations which operate on bodies which have been already preliminarily framed.

Framing systems for motor-vehicle bodies have been known and used since long, which comprise a framing station and a conveyor line for supplying the framing station with a sequence of lower body sub-assemblies or a sequence of preassembled bodies, and for bringing the framed bodies out of the framing station. The framing station comprises locator means for locating and clamping the component parts of a body in the proper assembling position, and assembling means for applying a plurality of welds or clinched joints or riveted joints to the located and clamped body. The afore-said locator means comprises at least one pair of locating and clamping structures provided at the two sides of the line at the framing station, each pair of side structures being provided with a plurality of locating and clamping devices for engaging the component parts of a motor-vehicle body or a sub-assembly thereof, said locating and clamping devices being shaped and arranged so as to be adapted to a specific model of motor-vehicle body. The afore-said side locating and clamping structures are displaceable along a direction transverse with respect to the conveyor line, between a closed operative condition, in which they are relatively closer to each other, to engage the component parts of the body which is at the framing station, and an opened operative condition, in which said side locating and clamping structures are more spaced apart from the line, to enable activation of the conveyor line in order to replace a framed body with a new body to be framed at the framing station and/or to enable, if necessary, the component parts of the side portions of a body to be prepared on the two side locating and clamping structures.

The applicant company has been manufacturing and marketing for a long time framing systems of the above indicated type under the trademarks ROBOGATE and OPEN ROBOGATE. Some of the most recent embodiments have been disclosed in European patent applications EP-A-1 611 991, EP-A-1 686 048, EP-A-1 837 120, EP-A-1 897 653, EP-A-1 918 182 and EP-A-1 935 554.

The framing systems of the above indicated type have the relevant advantage to be easily adapted to operate on different types or models of motor-vehicle bodies. To this end, many pairs of side locating and clamping structures are provided which are rapidly interchangeable with each other at the operative position in the framing station. Each pair of these structures is provided with locating and clamping devices shaped and arranged so as to conform with the shape and the dimensions of a specific body model. Due to these features, the framing stations is thus able to operate in a flexible way on any possible mix of different types or models of bodies which are advanced along the line, so as to enable a quick adaptation of the production to the demand from the market, while also ensuring a uniform assembling quality, given that all the bodies of a same type are located and clamped precisely during assembling by means of the same locating and clamping devices.

However, limitations exist to the degree of flexibility of the framing systems which have been made and used heretofore. In particular, limitations exist with regard to the admissible variations in the longitudinal length and/or in the transverse width of the different types of bodies on which the framing station is able to operate.

A system as indicated in the preamble of claim 1 is known from EP-A-1 611 991. A flexible framing station with movable locators is also known from GB-A-2 151 991.

BRIEF SUMMARY

It is an object of the present invention to overcome the above mentioned drawback of the prior art, by providing a system for framing motor vehicle bodies which can be easily adapted to operate on different types or models of body, even in the case of very relevant variations in the longitudinal length and/or transverse of the different body types or models, such as in the case for example of the body of a van or a light truck and the body of a so-called class-A motorcar, in which the differences in length may come to be in the order of 1-1.5 meter (m) or more and the differences in width may be in the order of 1 meter (m).

A further object of the invention is that of providing a framing system of the above indicated type which has a relatively simple and inexpensive structure and nevertheless proves to be efficient and reliable in operation.

A further object of the invention is that of providing a framing system of the above indicated type which can be easily configured as a flexible system having a very high productivity, with minimum time losses in connection with replacement of the toolings when a change in the type of body to be framed must be carried out.

Finally, a further object of the invention is that of providing a framing system which ensures a very high precision and quality of the assembled bodies, with the aid of very simple means.

In view of achieving the above indicated objects, an example of the invention provides a framing system for motor vehicle bodies or sub-assemblies thereof having the features indicated in claim 1.

Due to the above mentioned features, the side locating and clamping structures can be easily and rapidly configured to become adapted to operate on different types of bodies having also very relevant differences in their longitudinal length and/or transverse width, while ensuring in any case the dimensional stability and the working precision of said locating and clamping side structures.

The platform of the above mentioned supporting structure can be dimensioned with a standard longitudinal length, proportionated to the longitudinal dimension of the longest type of body on which the system may operate. In this manner, it is possible to configure the locating and clamping structures which must operate on the longest type of body by providing the above mentioned pillars at, or close to, the opposite ends of the platform. Similarly, the side locating and clamping structures can be easily adapted to operate on bodies of the shortest type by mounting the above mentioned pillars on the platform at a reduced reciprocal distance. The positioning of the pillars on the platform can be varied also along the direction transverse to the longitudinal direction of the line, in view of any relevant differences in width between different types of bodies.

Due to the provision of a standard base platform for the side locating and clamping structures, the entire system, once installed, does not have limitations with regard to the possibility of application to any type of body, since it can be easily adapted to operate also on bodies which have very relevant differences in length and/or width. This result represents a dramatic improvement with respect to those systems which have been made heretofore which, once designed and installed, do not prove to be of use for bodies which have very relevant dimensional differences with respect to the type of body for which the systems have been made.

According to a preferred feature, the frame of each side structure which carries the locating and clamping devices is in contact with said supporting structure so as to unload thereon its weight and the horizontal transverse reaction forces applied by the body to the locating and clamping devices as a result of the engagement of these devices on the body during the framing operation. For instance, these transverse forces can be generated as a result of a greater width of the body with respect to the nominal dimension, within the design tolerances.

In the simplest embodiment, the system according to the invention is provided with a single pair of side locating and clamping structures, being understood that, due to the above mentioned features, the system is able to be easily adapted to operate on a different type of motor-vehicle body, or can be transformed into a flexible system adapted to operate on two or more different types of motor-vehicle bodies. In the preferred embodiment, however, the system is provided with at least two pairs of side locating and clamping structures, which are adapted to operate on two respective models or types of bodies and they are rapidly interchangeable which each other at the framing station. In particular, according to a technique known per se, each side locating and clamping structure is displaceable along one longitudinal direction parallel to the line between the above mentioned operative position at the framing station and a waiting position, upstream or downstream of the operative position.

In the example of this preferred embodiment in which the possibility is provided for a longitudinal exchange of the locating and clamping structures at the two sides of the framing station, the system further comprises means for ensuring precise positioning of each of said side structures when it comes to said operative position at the framing station.

According to a first solution, which corresponds to the most conventional technique, the above mentioned means comprises a device for raising the entire side structure from its longitudinal guides in order to locate it in position.

Preferably however in the system of the invention the guiding rails on which each locating and clamping structure is slidably mounted are provided in form of high-precision guides, cooperating with high precision pads or rollers, so that the rails themselves ensure the proper positioning of the structure both vertically and transversely with respect to the line.

Finally, a variant is also provided in which each side locating and clamping structure is slidably mounted on its longitudinal guiding rails with a slight play, high-precision auxiliary guiding means being provided which are engaged only at a terminal portion of the longitudinal travel of each locating and clamping structure towards the above mentioned operative position at the framing station.

BRIEF DESCRIPTION OF THE DRAWINGS

Further characteristics and advantages of the invention shall be clear from the description that follows with reference to the attached drawings, purely provided by way of non-limiting example, wherein:

FIG. 4 is a cross-sectional view along the medium longitudinal plane of the station of FIG. 3;

FIGS. 5A, 5B show the framing station in two different solutions, in which the bodies are transported by pallets and skids, respectively;

FIG. 9 is a diagrammatic plan view which shows the solution of FIG. 8;

FIGS. 16 and 17 are views at an enlarged scale of those of FIGS. 14 and 15, which show the side locating and clamping structure.

DETAILED DESCRIPTION OF EMBODIMENTS

In its preferred embodiments, the motor-vehicle body framing system according to the invention is made according to a general configuration which is known per se from documents such as EP-A-1897653. According to this configuration, a conveyor line 1 is provided having conveyor means of any known type and passing through a station 2 for framing motor-vehicle bodies.

The embodiments which are shown in the annexed drawings refer to a solution in which the conveyor line 1 is used to supply the framing station 2 with a sequence of lower sub-assemblies (floor panels) of motor-vehicle bodies. The remaining component elements of the body are assembled with the lower body sub-assembly at the framing station, before attending to assembling thereof. However, the invention is equally applicable to the case in which the conveyor line 1 is used to supply the framing station 2 with a sequence of bodies which are already preliminarly assembled.

Figure 1:
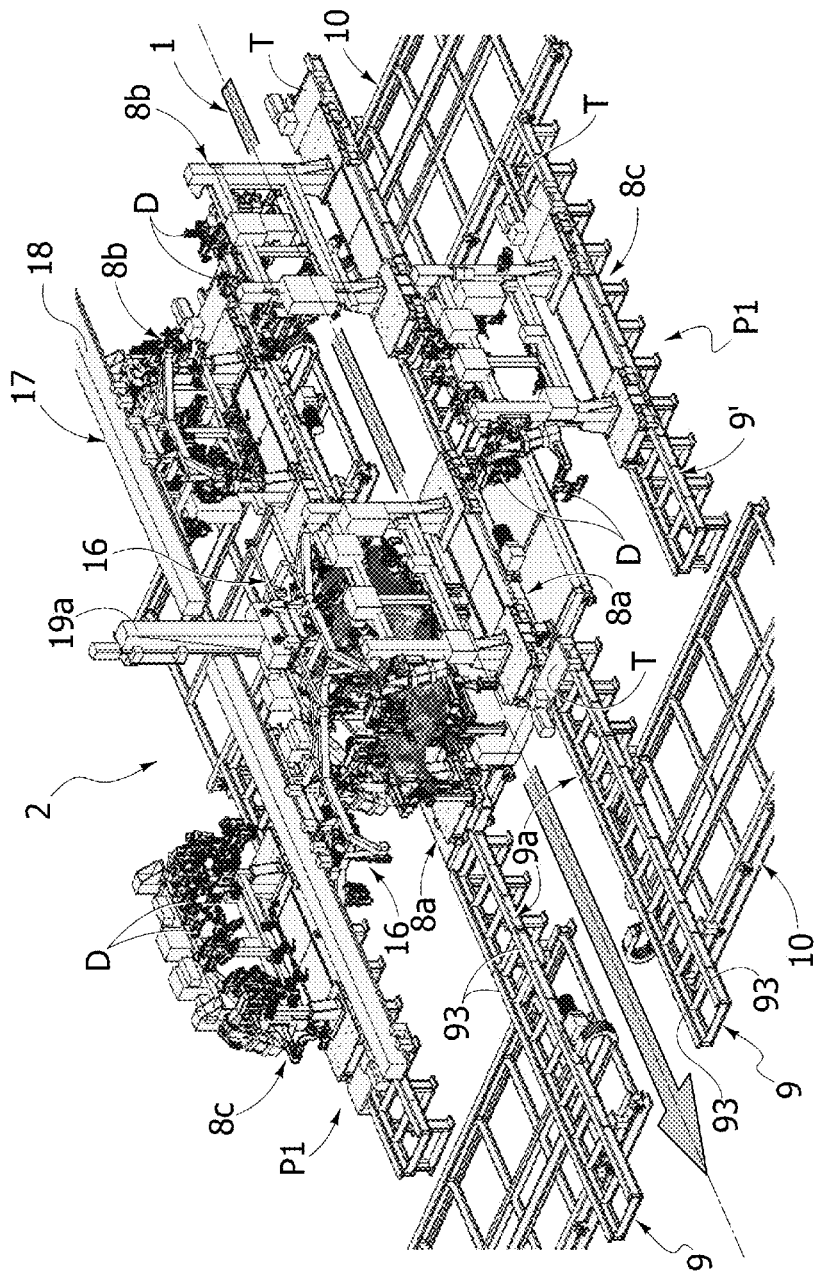
FIG. 1 is a perspective view of a preferred embodiment of the framing system according to the invention.
Figure 2:
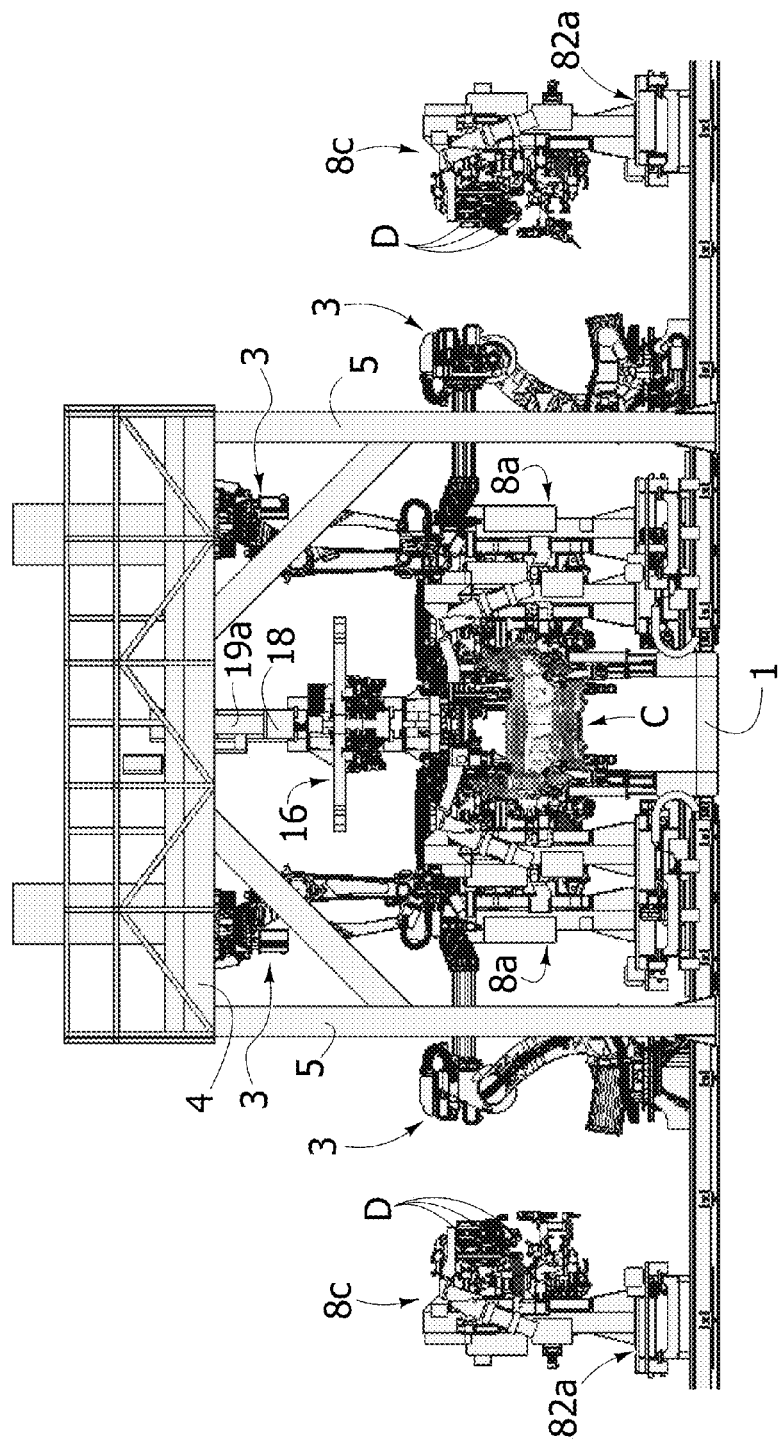
FIG. 2 is a diagrammatic view, in cross-section, of the framing system of FIG. 1, along a plane perpendicular to the longitudinal direction of the body conveyor line.

In FIG. 2, reference numeral 3 is used to designate a plurality of programmable robots which are provided at station 2. The robots are provided with welding heads of any known type for electric spot-welding. The illustrated example relates to the case of assembling by welding, but it is clearly evident that the invention is applicable also to any other assembling technique (laser welding, clinching, riveting). Also in the case of the example shown three welding robots 3 are provided at each side of line 1 on the floor of the plant and further robots 3 are suspended from an elevated structure 4, forming part of a framework including columns 5 supported on the floor of the plant. The framework and the robots 3 are visible in FIG. 2, whereas they have been removed from FIG. 1, for sake of clarity. According to a technique known per se, the robots 3 are able to carry out a plurality of electric welding spots for connecting the lower sub-assembly of the body to the two sub-assemblies constituting the side portions of the body, as well as for connecting one or more upper cross-members to the two side portions, and also for connecting the components of each side portion to each other.

Figure 5B:
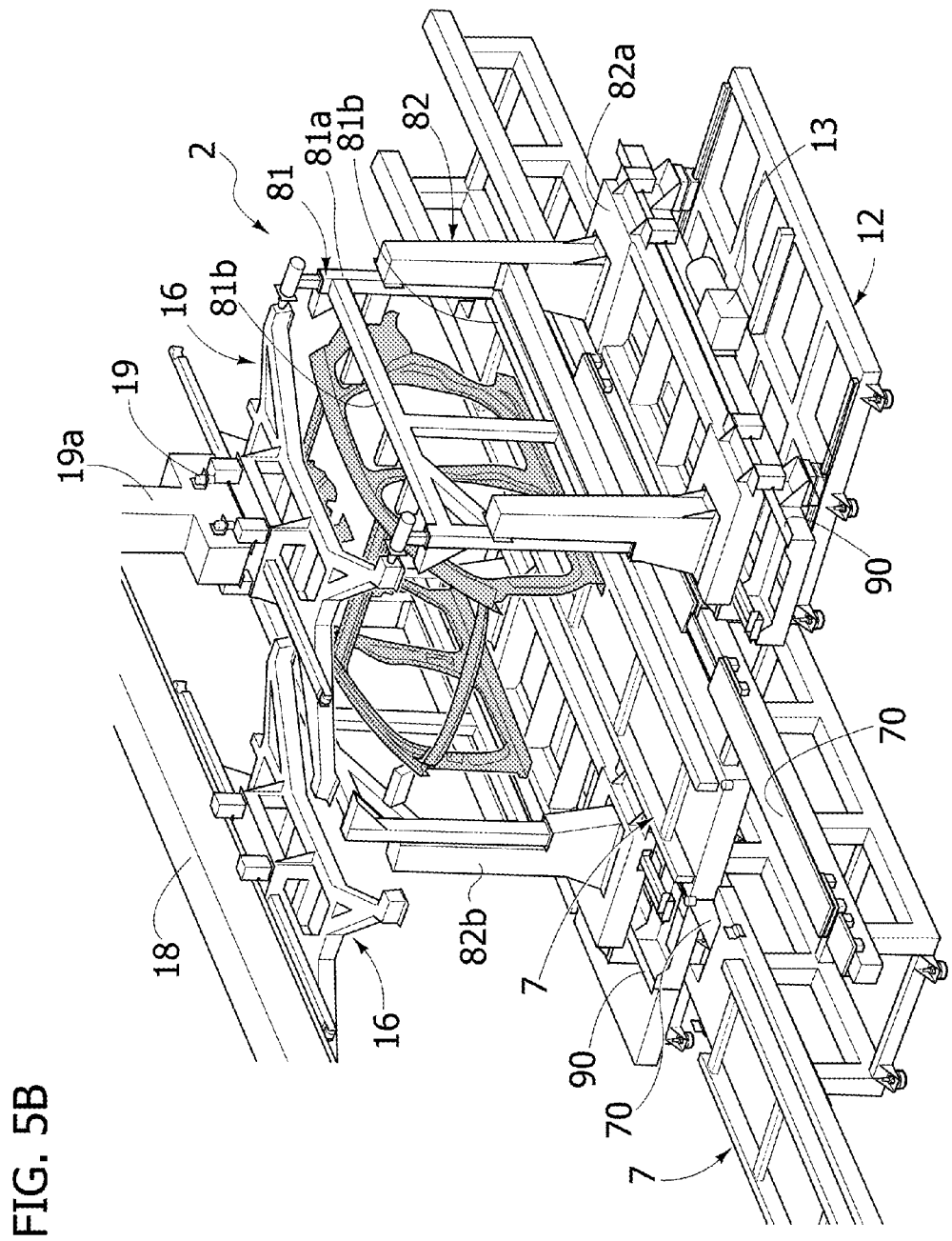

As already indicated, the conveyor means provided at line 1 may be made in any known way. For instance, line 1 may be of the type in which each lower body sub-assembly is supported on a pallet 6 (FIG. 5A) provided with locating and/or clamping devices 6a for precise positioning of the sub-assembly. Alternatively to this solution, each lower body sub-assembly may be supported on a simple frame or "skid" 7, as shown in FIG. 5B, in which case the lower body sub-assembly is located and clamped in position at the framing station by means of locating and clamping devices which are provided at the framing station. In this case, if the system operates on at least two different types of body, the locating and clamping devices for the floor panel of the two different types are carried by supporting structures 70 (FIG. 5B) which are movably guided longitudinally along the line so as to be quickly interchangeable at the operative position in the framing station, depending upon which specific type of body is at the station.

Also with reference to FIG. 1, the system illustrated therein is a flexible system able to operate on at least three different types or models of motor-vehicle bodies which are advanced in sequence along the conveyor line 1, according to any possible mix.

According to a known art, the framing station 2 is provided with means adapted to precisely locate and clamp the components of the body during the welding operations. To this end, at the framing station, at the two sides of line 1, there are provided two side locating and clamping structures generally designated by reference numeral 8, followed by a letter which is different for designating locating and clamping side structures which are to operate on different types of body. Thus for example the side structures designated by 8a,8b,8c are to operate on bodies of a first type A, a second type B and a third type C, respectively.

Also according to a known art, the side locating and clamping structures are provided with devices D of any known type for precisely locating and clamping the components of the body during the welding operations. These devices may have locating pins or supports adapted to engage the components of the body, to locate them in position, as well as clamping devices including clamps provided with pneumatic actuators and having jaws shaped according to the profile of the parts which they must engage. The arrangement and the shape of the locating and clamping devices is therefore a function of the configuration of the specific type of body to be welded. Therefore, also according to a known art, in order to operate on many different types of motor-vehicle bodies, the system according to the invention is provided with two or more pairs of side locating and clamping structures 8 which are quickly interchangeable at the operative position in the station. To this end, station 2 is provided with guiding tracks 9 extending longitudinally at the two sides of line 1, which enable the longitudinal displacement of the side locating and clamping structures 8 between an operative position at the framing station (which is occupied by structure 8a in FIGS. 1 and 2) and a waiting position longitudinally displaced upstream or downstream of the above mentioned operative position.

The means for controlling the longitudinal displacement of the side structures 8 can be made in any known way. However the preferred solution is that in which the side structures are mounted on self-propelled carriages or on carriages trailed by self-propelled tractor carriages, as it will be shown more in detail in the following.

The two structures 8 which are at the framing station can be displaced transversely to the longitudinal direction of the line 1 between an opened condition, in which they are relatively more spaced apart from each other and from line 1 and a closed condition (visible in FIG. 1), displaced towards line 1, to enable the locating and clamping devices carried thereby to engage the body which is at the framing station. In the opened operative condition, the structures 8 are aligned with the guides 9 to enable a longitudinal exchange of the two pairs of structures 8. FIG. 2 shows the side locating and clamping structures 8a in their operative closed condition, in which the locating and clamping devices D carried thereby are able to engage the structure of a body.

FIG. 1 also shows that, similarly to known systems already proposed by the applicant, the system according to the invention has one or more parking positions for a corresponding number of types of side locating and clamping structures 8, which are to operate on further types of motor-vehicle bodies. In the case of FIG. 1, a third type of structure 8c, which is to operate on a third type C of body is at a parking position P1 on a guiding track 9' which is oriented parallel to the longitudinal direction of line 1. Upstream and downstream of the framing station, the guides 9 comprise separate track portions 9a, formed by rails 93, which can be displaced transversely to the longitudinal direction on a conveyor 10, to bring said separate track portions 9a in alignment with a parking position P or with other parking positions adjacent thereto, which are not shown in the drawings. In this manner, it is possible to transfer a structure 8 which is at a parking position on the track portion 9*a* which then attends to bring it to the waiting position, adjacent to the operative position or, conversely, it is possible to take a structure 8 from the waiting position upstream or downstream of the station 2 to a remote parking position.

Systems of the above described type which have been made heretofore have limitations to their operative flexibility, particularly with reference to the admissible differences in length and/or width between different types of body on which the system can operate.

As it will become readily apparent from the following description, the present invention overcomes these limitations by providing a framing system which is able to operate also on bodies which are totally different from each other and in particular on bodies which have very relevant differences in their longitudinal length and/or in their transverse width.

Figure 13:
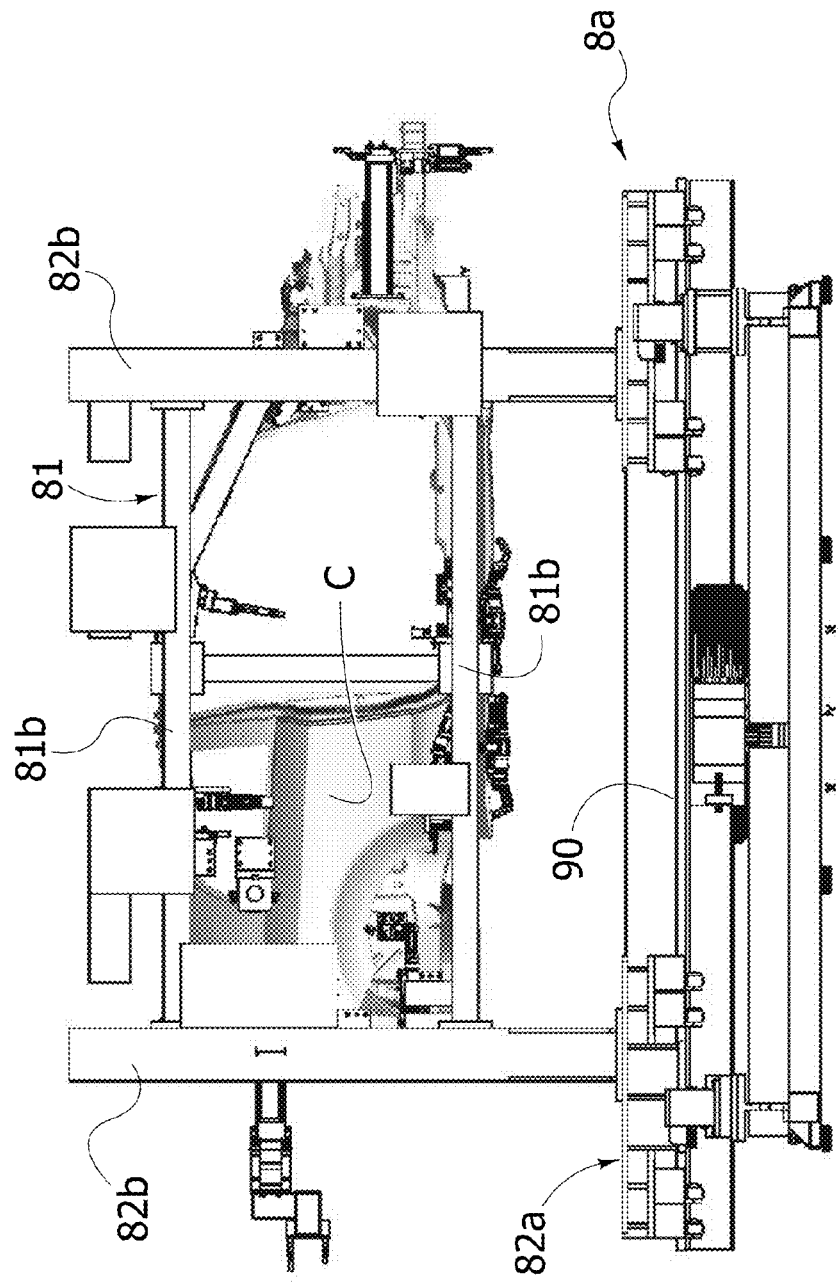
Figure 14:
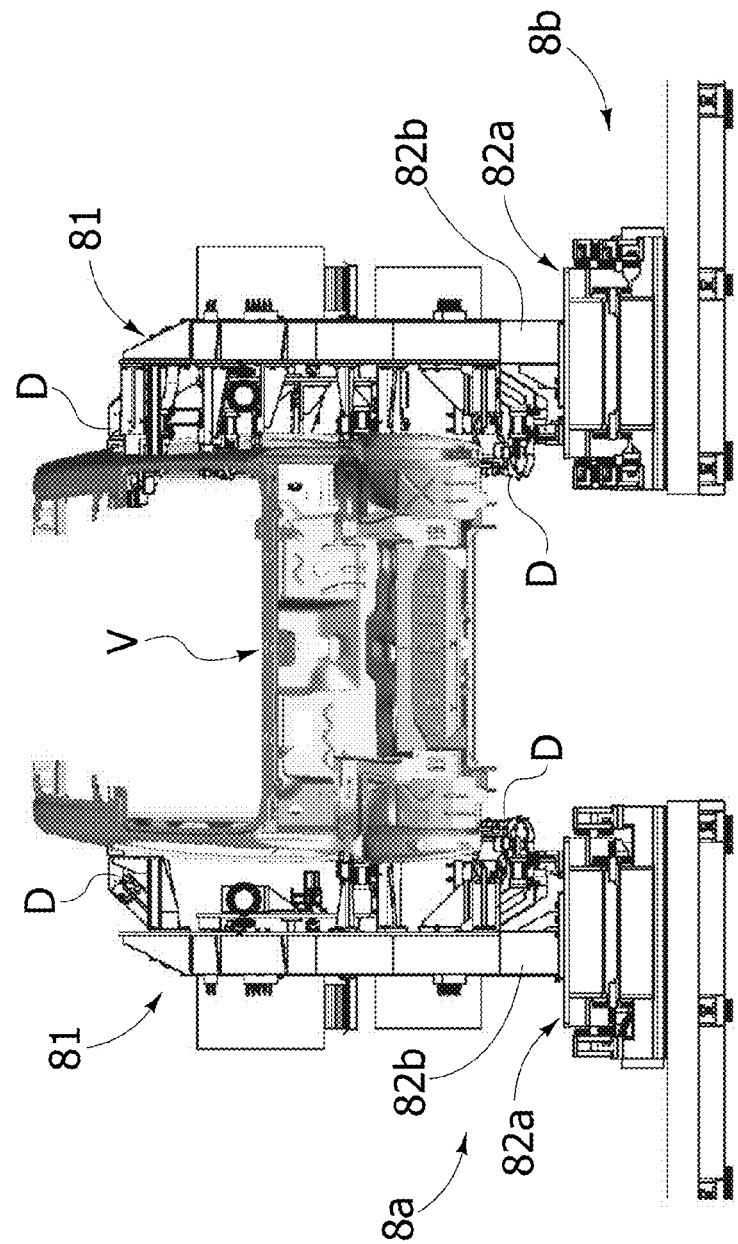
FIGS. 14 and 15 are views of the side locating and clamping structure in a plane perpendicular to the longitudinal direction of the conveyor line, in the configuration of FIG. 12 and FIG. 14, respectively.
Figure 15:
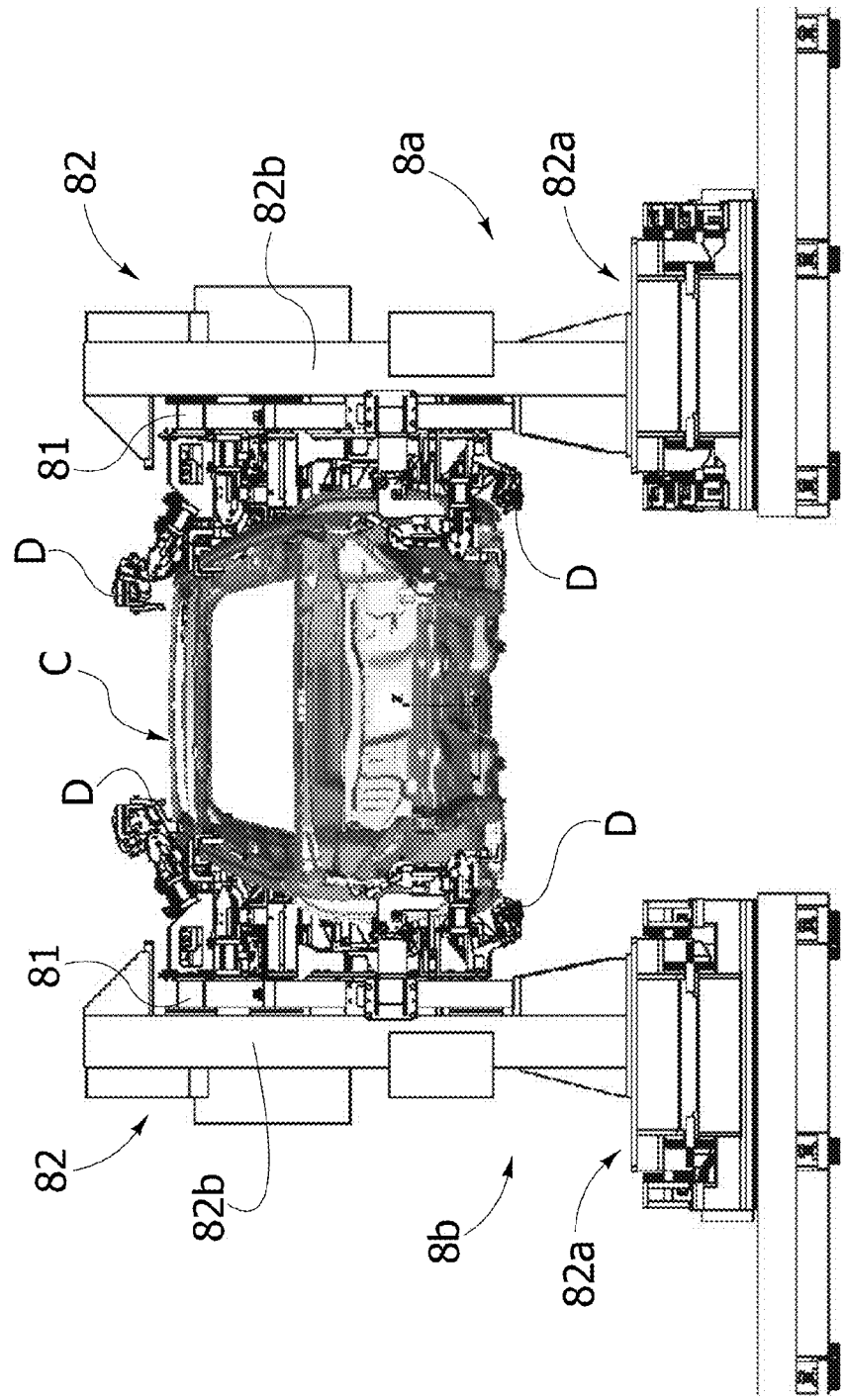
Figure 18:
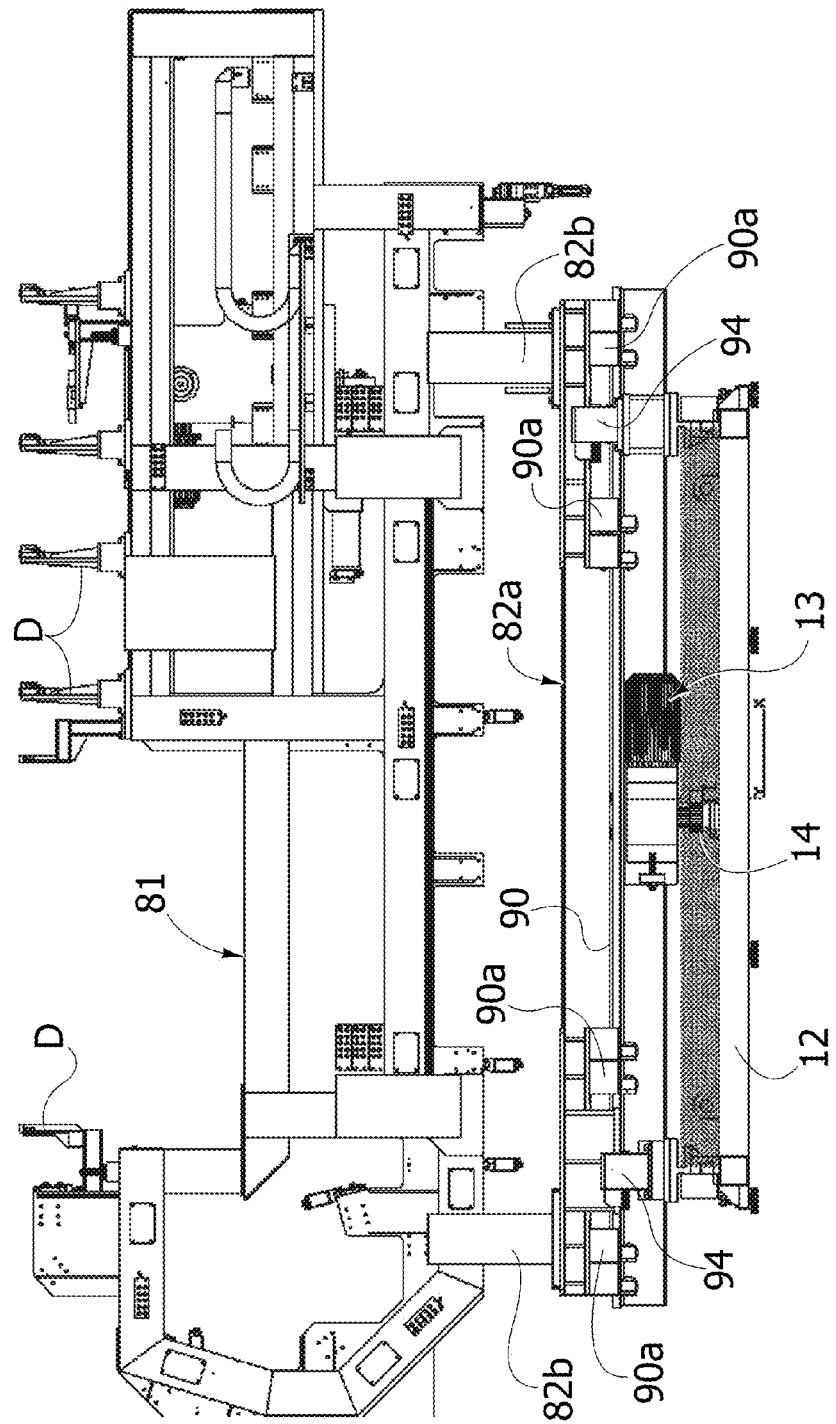
FIGS. 18 and 19 are views at an enlarged scale of FIGS. 12 and 13, which also show the side locating and clamping structure.
Figure 19:
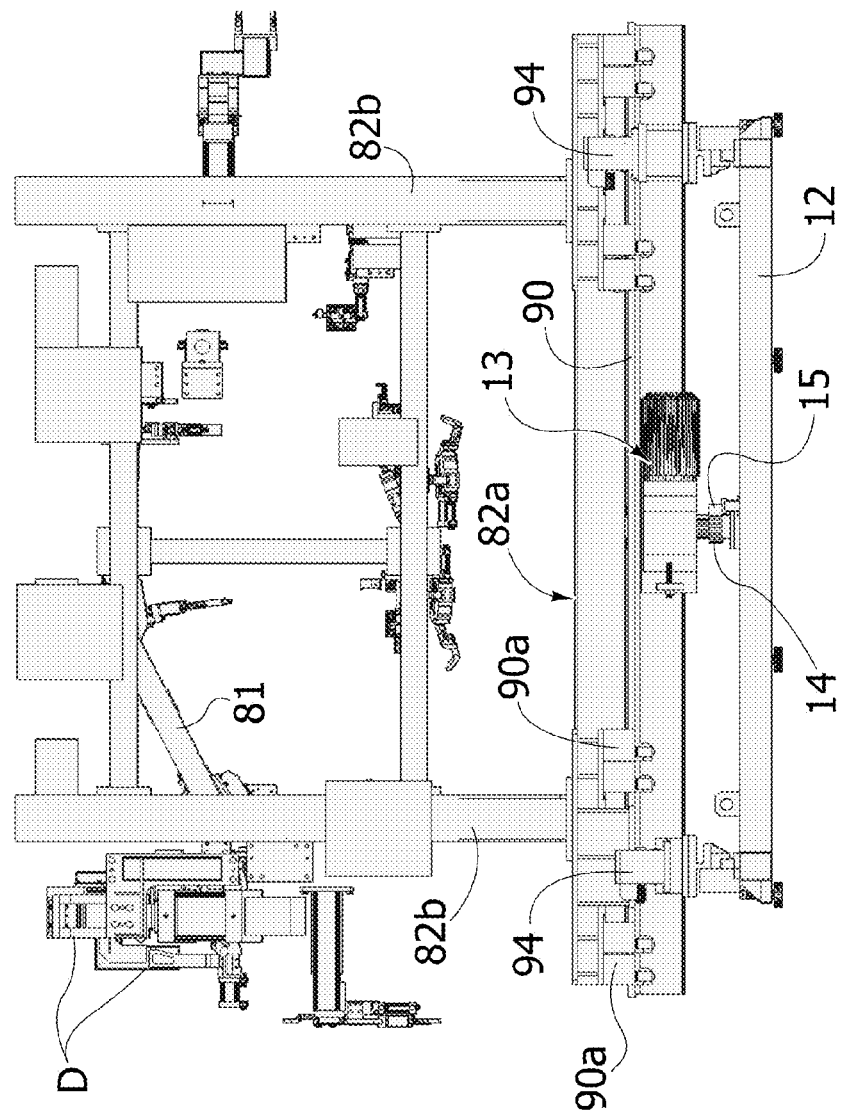

This advantage of the present invention is readily apparent from FIGS. 12, 13 and 14, 15 of the annexed drawings, which show that the side locating and clamping structures 8 of the system according to the invention can be easily configured, due to the features which will be described, so as to operate with full reliability and precision in one case on the body V of a commercial vehicle or van of relatively large dimensions (FIGS. 12 and 14) and in another case on the body C of a two-seated mini-car or a class-A car (FIGS. 13 and 15).

The key factor to solve this problem is represented, according to the invention, by the architecture conceived for each side locating and clamping structure 8.

In the case of the side structures 8*a* which are to operate on car bodies (see FIGS. 5A, 5B and 13, 15), each side locating and clamping structure 8 is basically divided into two parts. A first part is constituted by a quadrilateral frame 81, which is relatively light and comprises two uprights 81*a* connected by upper and lower cross-members 81*b*. This quadrangular frame 81 has the task of supporting the various locating and clamping devices D which are to engage the body to be framed. The second part of each side locating and clamping structure is constituted by a supporting structure 82 which is relatively rigid and heavy and comprises a platform 82*a* and at least two pillars or columns 82*b* which are substantially aligned with each other along a direction parallel to the conveyor line 1. Frame 81 is supported by the supporting structure 82, preferably by being rigidly and permanently connected thereto, for instance by means of screws or welds. The supporting structure 82 has the task first of all to support the weight of frame 81 and the devices carried thereon. To this end, the frame 81 rests on planar step-like support surfaces 82*c* of pillars 82*b*, as shown in FIG. 17. Moreover, the supporting structure 82 has also the task of supporting the transverse forces to which frame 81 is subjected as a result of the engagement of the body during the framing operation, which may be generated for instance by that the body has a greater width with respect to the nominal dimension, within the limits of the design tolerances. The frames 81 can be designed as relatively light structures, since the above mentioned forces are unloaded by frames 81 onto the supporting structures 82 to which they are connected. To this end, each frame 81 is in contact with the face of the supporting structure 82 facing towards the inside of the framing station and in particular with pillars 82*b*.

A further important feature of the present invention lies in that the pillars 82*b* forming part of said supporting structure 82 of each locating and clamping structure 8 are connected, preferably removably, to a standardized supporting platform, generally designated by 82*a*, which is dimensioned along the direction parallel to line 1 so as to have a length proportionated to the length of the longest model of body on which the system is to operate. In the case of the specific illustrated example, as visible in FIGS. 12-19, the longitudinal dimension of the platform 82*a* is selected so as to be adequate to the length of the body of a van on which the system is to operate. In the illustrated example, in the case of the side structures 8*b* which are to engage the van bodies, the frame 81 is self-supporting and is fixed to two small pillars 82*b* which are fixed to the platform 82*a* adjacent to the ends thereof. However it is possible to provide the same architecture described with reference to the side structures 8*a* which are to operate on the car bodies also for the side structures 8*b* which are to operate on the van bodies.

Thanks to the structure and the arrangement which have been described in the foregoing, the side locating and clamping structures 8 used in the system according to the invention can be easily configured to become adapted to specific types of motor-vehicle body, with no limitations to the variations in length of the bodies on which the system may operate, given that the platform 82*a* is chosen with a length adapted to operate on the bodies of maximum length, such as in the case of the bodies of commercial vehicles, vans or the like.

The connection of the pillars 82*b* to the platform 82*a* is preferably made by means of bolts. The connecting positions may vary both in the longitudinal direction, to enable adaptation to bodies of different length, and in the transverse direction, to enable adaptation to bodies of different width. The platform can be provided with a matrix of holes for the engagement of the connecting bolts, to enable the selection of the connection positions of the pillars carrying the frames which support the locating and clamping devices. Alternatively, it may be provided that the holes for the bolts are formed at any desired area of the platform, when the pillars must be installed.

As shown in FIGS. 13 and 17, when it is necessary to operate on much shorter bodies, the side locating and clamping structures 8 are configured with the two pillars 82*b* close to each other and with a frame 81 correspondingly dimensioned, having uprights 81*a* in contact with the inner faces of the two pillars 82*b*.

In one simpler embodiment of the invention, the system comprises a single pair of side locating and clamping structures which in any case have the architecture which has been described above. In this manner, the system can be used initially to operate on a single type of motor-vehicle body, being understood that it can be quickly configured to operate on a different body type, or transformed into a flexible system adapted to operate on different body types.

In the following, further specific feature of the system according to the invention will be described, with reference to the case of the preferred embodiment which is shown in the drawings.

Figure 3:
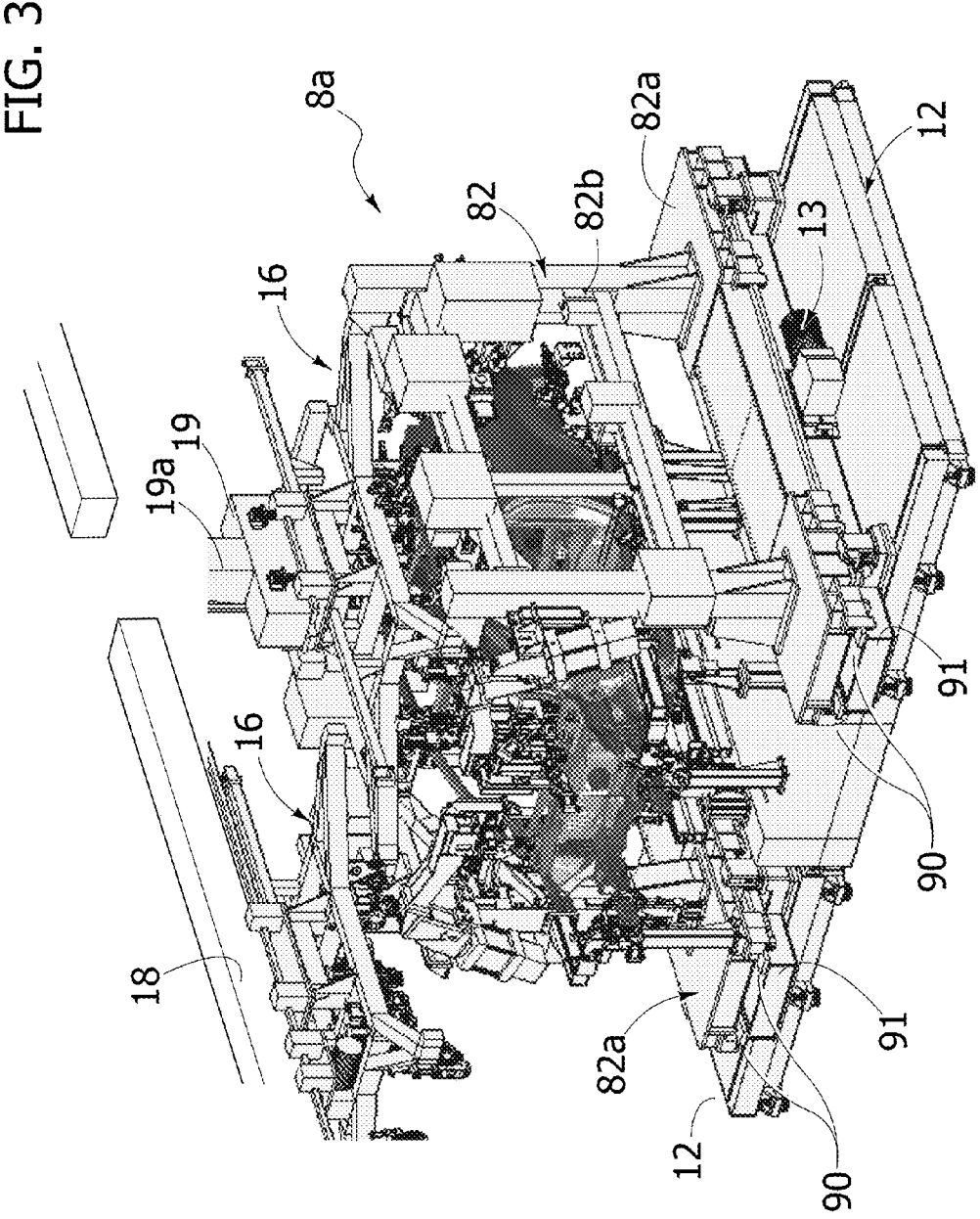
FIG. 3 is a perspective view at an enlarged scale of the framing station forming part of the system shown in FIG. 1.
Figure 7:
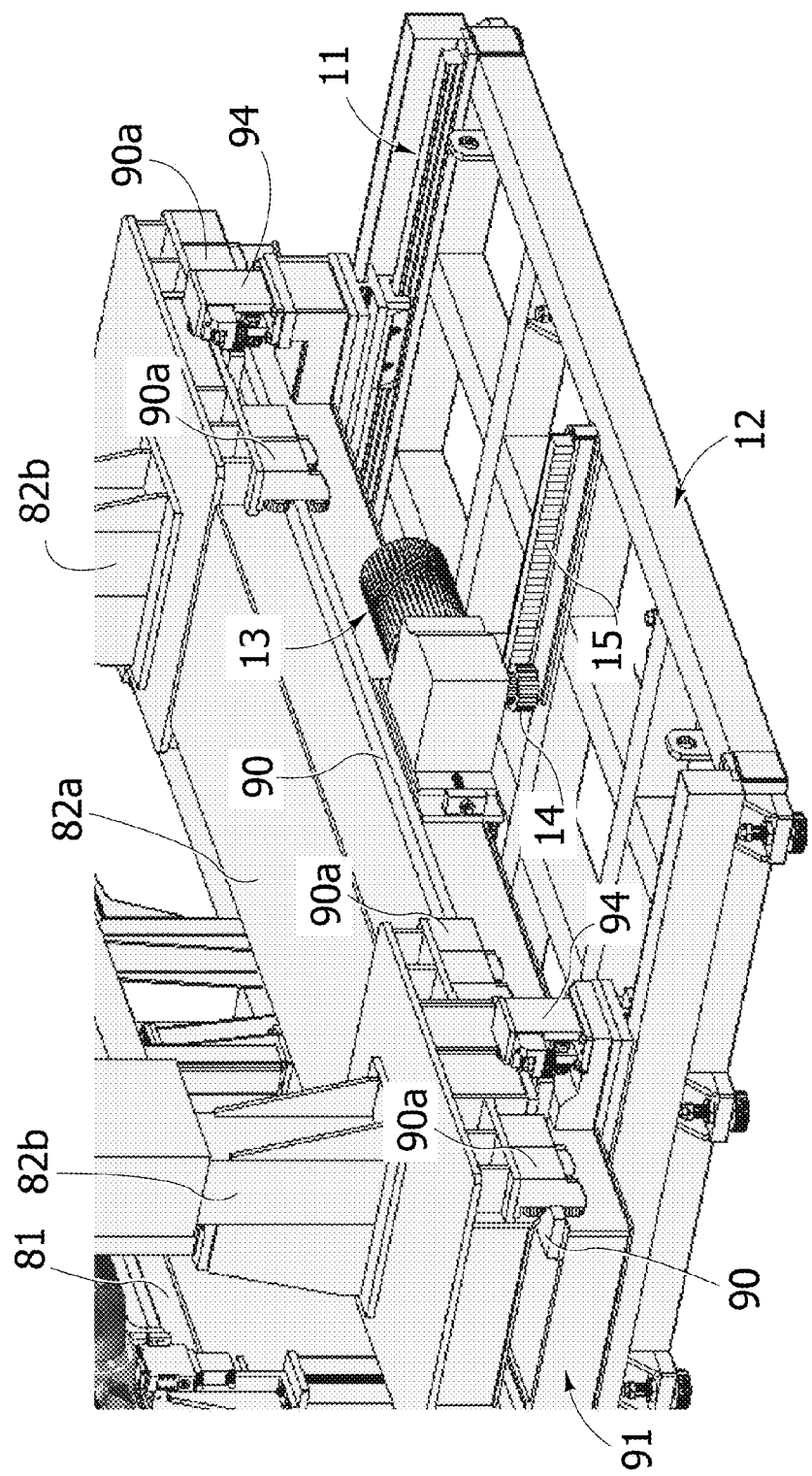
FIG. 7 is a perspective view at an enlarged scale of a detail of the system according to the invention, which relates to the solution in which longitudinal guides are provided in form of high-precision guides.

As shown in FIG. 3, the platform 82*a* of the side locating and clamping structure 8 which is at the operative position in the framing station is slidably guided on separate sections of the track guides 9, constituted by rail sections 90 aligned with the rail sections 93 of the tracks 9*a* arranged upstream and downstream of the framing station. The rail sections 90 are carried by a movable structure 91 which is slidably mounted along a direction transverse to the longitudinal direction of line 1 on guides 11 of a stationary base structure 12 (FIG. 7). The movable structure 91 is provided with a motor-reducing unit 13 which drives a sprocket 14 meshing with a rack 15 carried by the base structure 12 and directed transversely with respect to the conveyor line 1, so that activation of the motor-reducing unit 13 causes displacement of structure 91 along a direction transverse to the conveyor line 1. In this manner, the side locating and clamping structure 8 which is in the operative position at the framing station is movable transversely to the line between the "opened" condition, spaced more apart from the line, in which the rail sections 90 are aligned with the rail sections 93 (FIG. 1) and the "closed" condition, closer to the line, in which the locating and clamping devices D carried by the side structures 8 are able to engage the body which is at the station.

With reference to FIGS. 2-4, when the side structures 8 which are at the framing station are in their "closed" condition, they are further connected to each other by an upper spider-like structure 16 which forms, along with the side structures 8, a sort of rigid cage and carries further locating and clamping devices able to engage the upper portion of the body.

Similarly to the case of the side locating and clamping structures 8 for which different types are provided able to operate on corresponding different types of bodies, also in the case of the above mentioned upper spider-like structure 16, different types are provided. FIG. 4 shows that different structures 16 are movable along an elevated conveyor 17. A rail 18 of the conveyor 17 has a separate section 19 which can be lowered by means of a vertical-acting actuator device 19a, so as to bring the structure 16 which is at this rail section 19 to operate on the body which is at the framing station. When the rail section 19 is in its raised position, aligned with rail 18, the elevated conveyor can be activated to quickly exchange the spider-like structure 16 which is at section 19. The details of construction of the elevated conveyor 18 and the associated motor means, as well as those of device 19a, are not described nor illustrated herein, since they can be made in any known way. The deletion of these details from the drawings also renders the latter simpler and more easily understandable.

Figure 6:
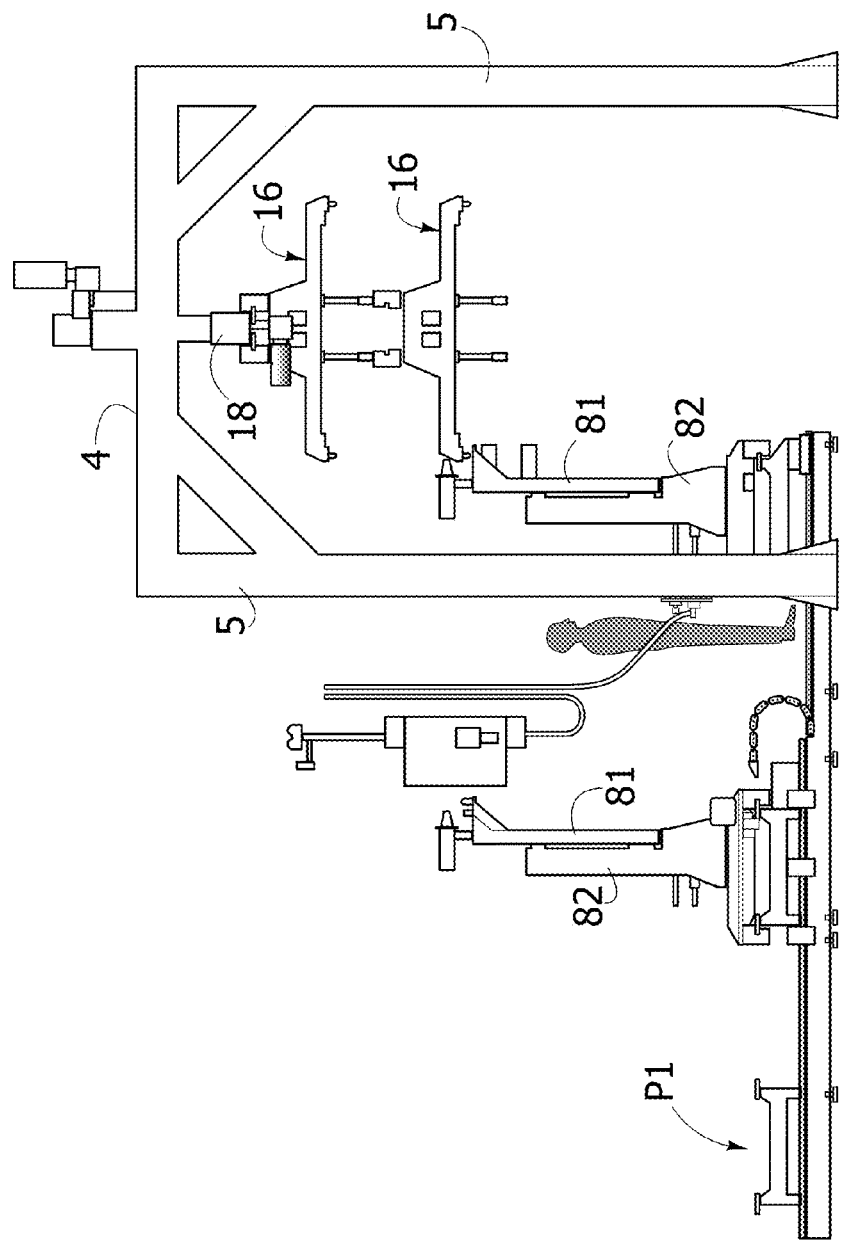
FIG. 6 is a diagrammatic view in cross-section, taken along a plane perpendicular to the longitudinal direction of the body conveyor line, which shows the system according to the invention in the case of manual loading of the components of the side portions of the body.

With reference to FIG. 6, when the side locating and clamping structures 8 are in the opened condition shown in this figure, it is possible to prepare thereon the component parts of the respective side portions of the body which must be assembled at the station. Once this preparation is completed, the side locating and clamping structures 8 can be moved transversely towards the line up to the final "closed" condition in which the locating and clamping devices are able to assemble and lock in position the various components of the body, while welding robots 3 perform a number of electric welding spots sufficient to impart a relatively stable geometry to the body. Once this operation is completed, the side locating and clamping structures 8 are brought back to the opened condition and the conveyor line is activated to take the framed body out of the framing station while bringing a new body sub-assembly into the station.

The above mentioned operation for arranging the component parts of the body side portions on the side locating and clamping structures can be carried out manually (as shown in FIG. 6) or also for instance by means of robots.

A further feature of the invention relates to the means which ensure a precise positioning of each side locating and clamping structure 8 when it is moved longitudinally until it reaches the operative opened condition at the framing station.

According to a first solution, which is conventional per se, when the side structure 8 reaches the operative opened condition at the framing station, this structure is taken up by a device for precise positioning which separate the structure 8 from the above mentioned guiding rails, locating it in position both vertically and in a direction transverse to the line 1.

Although this known solution is surely of interest in the system according to the present invention, in the preferred embodiment the precise positioning of the side structure 8 is obtained by adopting any of two further solutions.

In a first further solution (FIG. 7) it is provided that the rail sections 90 which are at the station are made as high-precision guides, cooperating with high-precision pads or roller guiding units 90a associated to each side structure 8, so that these rails themselves ensure the proper positioning of the structure 8 both vertically and transversely to the line. The precise positioning in the longitudinal direction is obtained when the closed condition is reached, by the engagement on a final portion of the transverse guides 11 which is made as a high-precision guide. FIG. 7 also shows pneumatic clamps 94 which clamp the structure 91 in the proper position along the transverse direction.

Figure 8:
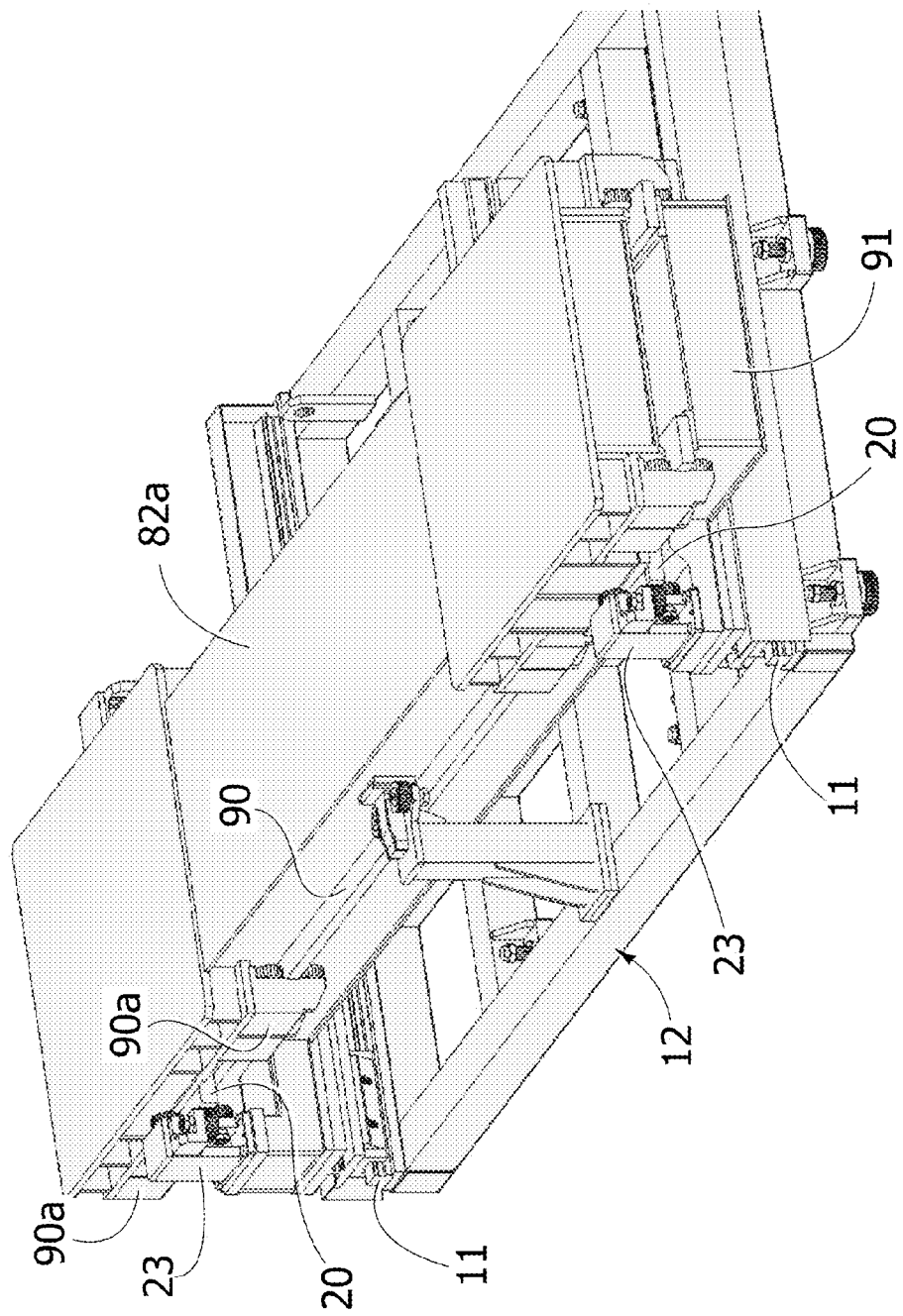
FIG. 8 is a further perspective view at an enlarged scale of a variant of the solution shown in FIG. 7, in which the longitudinal guides are not of the high-precision type, but high-precision auxiliary guiding means are provided which are engaged only during the final portion of the longitudinal travel of the side locating and clamping structure towards its operative position.
Figure 11:
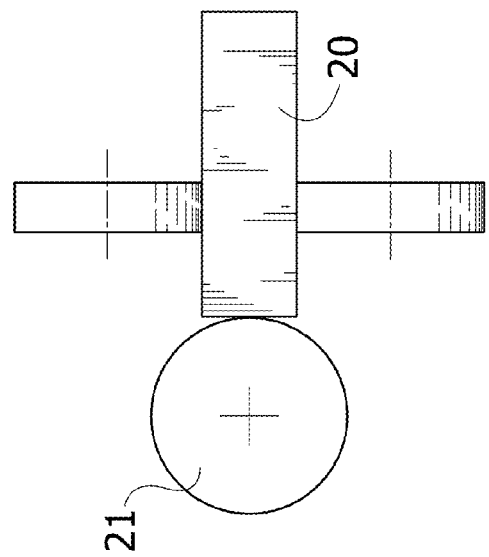
FIGS. 10 and 11 are further diagrammatic views of the system of FIGS. 8, 9.
Figure 10:
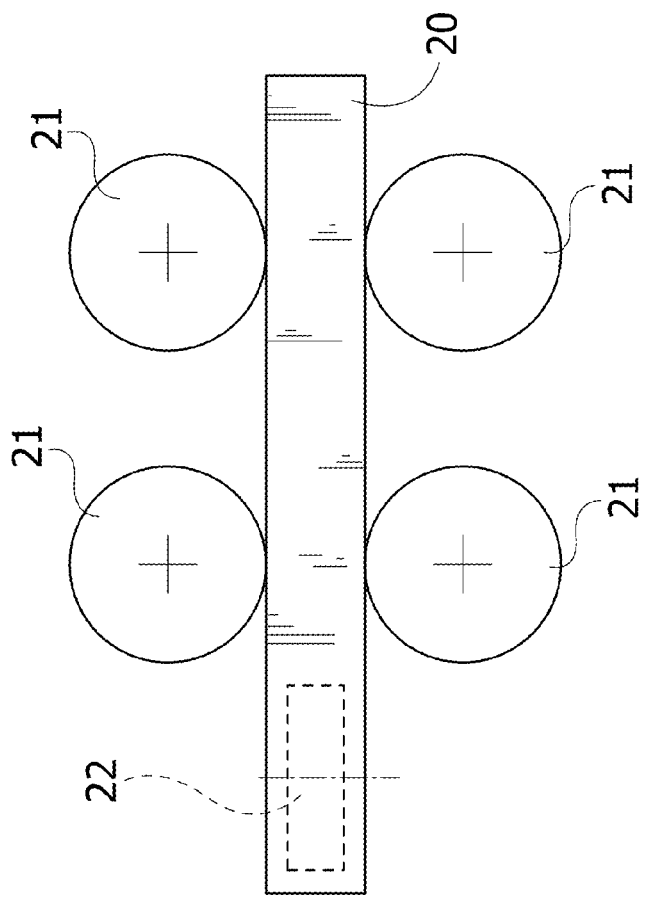
Figure 12:
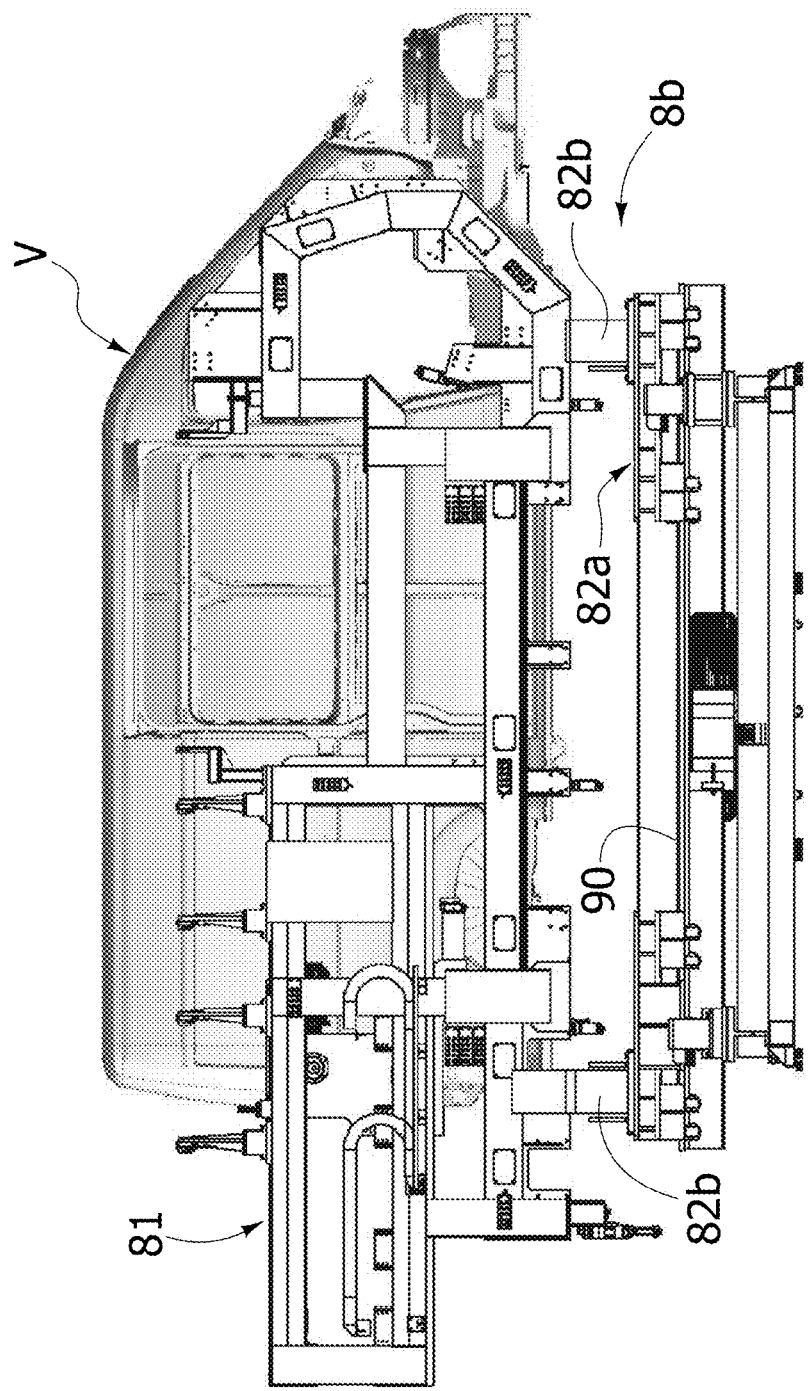
FIGS. 12 and 13 are diagrammatic side views of a locating and clamping structure for the body to be welded, configured for assembling the body of a commercial vehicle (van) and the body of a class-A motorcar, respectively.

According to a second further solution (FIGS. 8-11) the side locating and clamping structure 8 is slidably mounted on rail sections 90 with a slight play, the side structure 8 being further provided with high-precision auxiliary guiding means which are engaged only at a final portion of the longitudinal travel of the structure 8 towards the above mentioned operative position. As diagrammatically shown in FIG. 9, on the platform 82a of each side structure 8 there are arranged four short rail sections 20, projecting in a cantilever fashion from the two sides of platform 82a, at the two ends thereof. The auxiliary rail sections 20 are made as high-precision rails, cooperating with guiding rollers which are also of the high-precision type, which are designated in FIGS. 10, 11 by numerals 21, 22 and are carried by supports 23 (FIG. 8) mounted on the structure 91 which also supports the rail sections 90. Rollers 21, 22 are engaged by the high-precision auxiliary rails 20 at the final portion of the longitudinal travel of the platform 82a towards the operative position at the framing station. As clearly visible in FIGS. 10, 11, rollers 21, 22 respectively ensure the proper positioning of the side locating and clamping structure 8 in the vertical direction and in the horizontal transverse direction perpendicular to the line 1. Rollers 21 are able to engage the upper surface and the lower surface of sections 20, whereas rollers 22 engage the sides of sections 20.

In the foregoing description the details of construction of the motor means which are associated to each platform 82a in order to enable its displacement along tracks 9 have been omitted. These details can be made in any known way and may include for example the provision of a motor unit on board the platform 82a, driving rotation of a sprocket meshing with a longitudinal stationary rack. However, systems also have been already proposed which, as in the case illustrated in FIG. 1, make use of small self-propelled tractors T which can be connected to the platforms of the side locating and clamping structures 8 (see EP-A-1 611 991). Similar remarks apply also to the details of construction of the conveyor devices which move the track sections 9a transversely to their longitudinal direction, for alignment with the parking positions P.

As readily apparent from the foregoing description, the basic concept of the present invention lies in a new constructive architecture for the side locating and clamping structures 8 and is naturally applicable to framing stations having a lay-out also very different from what has been illustrated herein purely by way of example. In particular, the solution adopted to obtain the quick exchange of the side structures 8 which are at the station can be of any type, may be based on movements in any directions of the side structures and may make use of displacement means of any type.

Moreover, while the principle of the invention remains the same, the details of construction and the embodiments may widely vary with respect to what has been described and illustrated herein purely by way of example, without departing from the scope of the present invention as defined in the annexed claims.

The invention claimed is:

1. A system for framing motor-vehicle bodies or sub-assemblies thereof having:

a framing station;

a conveyor line for supplying the framing station with a sequence of component parts of a motor-vehicle body, the component parts being at least one of lower body sub-assemblies or pre-assembled bodies, and for transferring a framed body out of the framing station;

wherein said framing station comprises locator means for locating and clamping component parts in a proper assembling position and assembling means for applying a plurality of at least one of welds or clinched joints or riveted joints to located and clamped component parts;

wherein said locator means comprises multiple pairs of side locating and clamping structures which are interchangeable at an operative position at the framing station to operate on the component parts of respective different types of motor-vehicle bodies, each of said pairs of locating and clamping structures being provided at two opposing sides of the conveyor line at the framing station and each provided with a plurality of locating and clamping devices for engaging component parts, said locating and clamping devices being shaped and arranged so as to be adapted to engage the component parts of a specific model of a motor-vehicle body;

wherein each of the pairs of side locating and clamping structures, when at the operative position at the framing station, are movable along a transverse direction with respect to the conveyor line between a closed operative position for engaging component parts positioned at the framing station and an opened operative position in which they are relatively spaced more apart from each other, for at least one of activation of the conveyor line in order to replace a framed body with new component parts or for positioning new component parts on the side locating and clamping structures;

wherein the side locating and clamping structures each comprise a rigid supporting structure and a frame carrying said locating and clamping devices and supported by said supporting structure;

wherein said supporting structure of each side locating and clamping structure is slidably movable along longitudinal guides on a respective side of the conveyor line between its operative position and a waiting position, upstream or downstream of the framing station, and when the side locating and clamping structure is at said operative position, it is received above separate sections of said guides which are in the form of rail sections carried by a structure which is movable along a direction transverse to the conveyor line, each supporting structure having a base platform and at least two pillars for supporting a respective frame, the pillars removably connected to the platform at positions substantially aligned with each other along a longitudinal direction parallel to the conveyor line, the positions of said pillars relative to said platform both in the longitudinal direction parallel to the conveyor line and in a direction transverse with respect to said longitudinal direction being different for different frames provided for respective different types of motor-vehicle bodies, each platform forming part of the respective supporting structures of each of the side locating and clamping structures being identical for all of the different frames.

2. The framing system according to claim 1 wherein said frame is in contact with said supporting structure so as to unload thereon its weight and the transverse reaction forces applied by the component parts to the locating and clamping devices as a result of engagement thereof during a framing operation.

3. The framing system according to claim 2 wherein said frame is in contact with an inner side of the pillars facing towards the framing station.

4. The framing system according to claim 3 wherein each of said frames carrying the locating and clamping devices is in the form of a quadrangular frame with two uprights connected to each other by upper and lower cross-members, said uprights being connected to the inner side of said pillars of the supporting structure.

5. The framing system according to claim 1 wherein said rail sections are made with a precision sufficiently high for precisely positioning the side locating and clamping structure which is received thereon at the end of a longitudinal travel of the side locating and clamping structure towards its operative position at the framing station, both along a vertical direction and along a direction transverse to the conveyor line.

6. The framing system according to claim 1 wherein each side locating and clamping structure is arranged to engage the rail sections with play and is further provided with auxiliary guiding means which are engaged only in a final portion of a longitudinal travel of the side locating and clamping structure towards its operative position, so as to locate it precisely in position both along a vertical direction and along the direction transverse to the conveyor line.

7. The framing system according to claim 1 further comprising at least one upper structure carrying additional locating and clamping devices for engaging the component parts, said upper structure supported for rapid positioning at the framing station to rigidly connect a pair of side locating and clamping structures and for enabling engagement of the additional locating and clamping devices carried by the upper structure with the component parts.

* * * * *